(12) United States Patent
Fankhauser

(10) Patent No.: US 12,078,094 B2
(45) Date of Patent: Sep. 3, 2024

(54) PRE-CHAMBER AND INTERNAL COMBUSTION ENGINE

(71) Applicant: INNIO Jenbacher GmbH & Co OG, Jenbach (AT)

(72) Inventor: Thomas Fankhauser, Finkenberg (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/566,624

(22) PCT Filed: Jun. 2, 2021

(86) PCT No.: PCT/AT2021/060197
§ 371 (c)(1),
(2) Date: Dec. 1, 2023

(87) PCT Pub. No.: WO2022/251889
PCT Pub. Date: Dec. 8, 2022

(65) Prior Publication Data
US 2024/0247605 A1 Jul. 25, 2024

(51) Int. Cl.
*F01P 3/12* (2006.01)
*F02B 19/16* (2006.01)
(Continued)

(52) U.S. Cl.
CPC ............... *F01P 3/12* (2013.01); *F02B 19/16* (2013.01); *F02F 1/16* (2013.01); *F02F 11/002* (2013.01)

(58) Field of Classification Search
CPC ..... F01P 3/12; F02B 19/16; F02F 1/16; F02F 11/002
(Continued)

(56) References Cited

U.S. PATENT DOCUMENTS

| 6,513,483 B2 * | 2/2003 | Riggs | F02B 19/12 123/267 |
| 8,757,127 B2 * | 6/2014 | Ishida | F01P 3/16 123/275 |

(Continued)

FOREIGN PATENT DOCUMENTS

| AT | 521514 A4 | 2/2020 |
| CN | 106870095 B | 12/2019 |

(Continued)

OTHER PUBLICATIONS

PCT International Search Report and Written Opinion; Application No. PCT/AT2021/060197; dated Mar. 17, 2022; 12 pages.

*Primary Examiner* — Sizo B Vilakazi
(74) *Attorney, Agent, or Firm* — Fletcher Yoder, P.C.

(57) ABSTRACT

Pre-chamber component for an internal combustion engine comprising a longitudinal axis and a gasket for sealing a coolant jacket disposed around the pre-chamber component against a main combustion chamber of the internal combustion engine, which gasket can be braced against a cylinder head of the internal combustion engine, wherein a flange is provided on the pre-chamber component which flange is axially distanced from the gasket along the longitudinal axis in a direction away from the main combustion chamber when the pre-chamber component is mounted in the cylinder head, wherein there are provided a plurality of through holes through the flange which end in a space between the gasket and the flange.

20 Claims, 4 Drawing Sheets

(51) Int. Cl.
*F02F 1/16* (2006.01)
*F02F 11/00* (2006.01)

(58) Field of Classification Search
USPC .............. 123/253, 254, 270, 271, 272, 273
See application file for complete search history.

(56) References Cited

U.S. PATENT DOCUMENTS

| | | | |
|---|---|---|---|
| 11,591,951 B2 * | 2/2023 | Northington | ......... F02B 19/165 |
| 2012/0325179 A1 * | 12/2012 | Herold | ................ F02B 19/1004 |
| | | | 123/254 |
| 2013/0139784 A1 * | 6/2013 | Pierz | ....................... F02B 19/16 |
| | | | 123/254 |

FOREIGN PATENT DOCUMENTS

| | | |
|---|---|---|
| CN | 112211742 A | 1/2021 |
| EP | 3051092 A1 | 8/2016 |

* cited by examiner

PRE-CHAMBER AND INTERNAL COMBUSTION ENGINE

CROSS-REFERENCE TO RELATED APPLICATION

This application is a National Stage entry from, and claims benefit of, PCT Application No. PCT/AT2021/060197, filed on Jun. 2, 2021, entitled "PRE-CHAMBER AND INTERNAL COMBUSTION ENGINE", which is herein incorporated by reference in its entirety.

BACKGROUND

The present invention concerns a pre-chamber component for an internal combustion engine, namely a pre-chamber component comprising a longitudinal axis and a gasket for sealing a coolant jacket disposed around the pre-chamber component against a main combustion chamber of the internal combustion engine, which gasket can be braced against a cylinder head of the internal combustion engine.

Pre-chambers are widely used in internal combustion engines, acting as ignition amplifiers to ignite the burnable mixture in the main combustion chamber effectively.

The pre-chambers are commonly arranged in cylinder heads, to be more precise in a dedicated bore in which not only the pre-chamber but also the spark plug sleeve together with the spark plug is arranged. Mostly, the spark plug sleeve and the pre-chamber body is surrounded by the coolant jacket in which the cylinder head coolant is circulating. The coolant therefore cools down the respective parts, the cylinder head wall confining the coolant jacket as well as the flame deck. This design is, e.g., shown in EP 3051092 A1. A gasket is provided which is braced against the cylinder head in order to mount the pre-chamber component in the cylinder head and provide sealing of the coolant jacket and the main combustion chamber. In the case of EP 3051092 A1, the coolant flows from "bottom to top", i.e., from the flame deck to the upper part of the cylinder head.

AT 521514 A4 describes a cylinder head without a pre-chamber and a cooling concept, where the cooling water flow direction is reversed, also referred to as "top-down cooling". The coolant flows from an upper partial cooling duct of the cylinder head to a lower partial cooling duct near the flame deck, wherein the cooling water passes an intermediate deck. The intermediate deck comprises a conical shaped portion at which an element comprising recesses is arranged. The conical shaped portion directs the cooling water in a direct of the pre-chamber.

Another example of a cylinder head with a pre-chamber is known from CN 106870095 A, which also discloses a certain reversal of the cooling medium flow.

The fact of the matter is that, in all known cooling concepts for cylinder heads with pre-chambers, the cooling of the gasket is worthy of improvement considering that the gasket is very close to the tip portion of the pre-chamber component which protrudes into the main combustion chamber. This area experiences some of the highest thermal and mechanical loads in the internal combustion engine under operation. Heat transferred to the gasket can therefore cause the gasket or the sealing ring between the gasket and the cylinder head to fail after an unsatisfactory amount of operating hours should there be inadequate cooling.

It is therefore clear that improved cooling of the gasket leads to a longer lifetime of the seal, i.e., longer intervals until it needs to be replaced and potentially longer service intervals of the internal combustion engine as a whole.

BRIEF DESCRIPTION

An aspect of the invention is therefore to increase the lifetime of the pre-chamber sealing, in particular in the form of a sealing ring.

This aspect is achieved with a pre-chamber component according to the claims, namely in that a flange is provided on the pre-chamber component which flange is axially distanced from the gasket along the longitudinal axis in a direction away from the main combustion chamber when the pre-chamber component is mounted in the cylinder head, wherein there are provided a plurality of through holes through the flange which end in a space between the gasket and the flange.

Counter to intuition, an embodiment of the invention at first provides the flange which decreases the effective cross-section of the coolant jacket in the flow path of the coolant. This leads to higher flow velocity of the coolant flowing through the through holes. It turns out that this positive effect of the increased flow velocity outweighs the disadvantage of the decreased cross-section of the coolant jacket, and the cooling of the gasket and the surrounding areas is significantly improved.

This is especially true if the cooling is set up such the coolant flows through the through holes from a side of the flange facing away from the gasket ("top-down cooling") as the through holes direct the coolant flow onto the gasket such that the coolant flow impinging on the gasket absorbs heat from the gasket in an optimised manner.

The longitudinal axis of the pre-chamber component is a result of the geometric arrangement of the pre-chamber and/or a riser passage contained within the pre-chamber component. It is usually parallel to or coincides with a longitudinal axis of the main combustion chamber, although this is not absolutely necessary.

The longitudinal axis may be a rough symmetry axis of the pre-chamber and/or the riser passage.

The coolant jacket is usually created as a cavity disposed between the pre-chamber component and the surrounding cylinder head when the pre-chamber component is mounted therein. Although providing separate component parts, e.g., for guiding the coolant flow inside the coolant jacket is in principle possible.

Water is used as coolant in many cases, although there may be additives, e.g., for inhibiting corrosion or improving the heat transfer of the coolant. Other types of coolants, such as oil, are of course conceivable in principle.

The gasket preferably circumferentially encloses the pre-chamber component as a protrusion carrying some surface, which is braced against the cylinder head. This surface may also take part in the sealing of the main combustion chamber and the coolant jacket. For this sealing purpose a sealing ring may be present.

Such a sealing ring may be manufactured from copper and/or iron and/or steel.

Preferably, this surface is oriented transversely with respect to the longitudinal axis of the pre-chamber component and/or ring shaped.

The flange preferably circumferentially encloses the pre-chamber component as a protrusion.

The gasket and/or the flange preferably completely circumferentially enclose the pre-chamber component (i.e., 360°).

Preferably, there is exactly one gasket and/or exactly one flange comprising the through holes according to the invention, although embodiments with more than one flange and/or more than one gasket are in principle conceivable.

The space between the gasket and the flange could be called an undercut.

The pre-chamber component can preferably be of roughly circular cylindrical base shape (at least in the vicinity of the gasket and the flange) onto which cylindrical base shape the gasket and/or the flange are attached.

The gasket and/or the flange are preferably formed integrally with the base shape of the pre-chamber component (i.e., of the same material, monolithic). However, attaching the gasket and/or the flange to the base shape of the pre-chamber component part is in principle conceivable.

Another positive effect of an embodiment of the invention is that the main body of the pre-chamber component is not cooled too much, which could have a detrimental effect on the ignition and combustion in the pre-chamber as it requires a specific temperature range of the main body of the pre-chamber component. The embodiment of the invention therefore allows for highly effective and highly specific cooling of the gasket and the sealing surface.

The (main) body of the pre-chamber component preferably encloses a pre-chamber (volume) and/or a riser passage and/or spray passages, which preferably are in fluid communication with the main combustion chamber when the pre-chamber component is mounted in the cylinder head.

Protection is also sought for
- an arrangement comprising a cylinder head and a pre-chamber component according to an embodiment of the invention, wherein the gasket is braced against the cylinder head, in particular a fire plate of the cylinder head, possibly via a sealing ring,
- an internal combustion engine comprising such an arrangement and/or comprising a pre-chamber component according to an embodiment of the invention, and
- the use of a pre-chamber according to an embodiment of the invention or the arrangement mentioned before in an internal combustion engine, in particular such that the coolant flows through the through holes from a side of the flange facing away from the gasket (top-down cooling).

The internal combustion engine according to an embodiment of the invention can be
- a stationary and/or naval engine and/or
- a gas engine, preferably fueled by natural gas or other gases containing hydrocarbons and/or ammonia, and/or configured for driving (i.e., mechanically connected to) an electric generator (genset).

Further advantageous embodiments of the inventions are defined in the dependent claims.

Particularly preferably the through holes can be oriented towards the gasket.

That the through holes are oriented towards the gasket can understood such that an imaginary straight continuation of a middle axis of the respective through hole intersects the gasket.

The through holes may be configured to direct at least a portion of a coolant onto the gasket when the coolant flows through the through holes from a side of the flange facing away from the gasket.

The through holes can begin on a first axial surface of the flange facing away from the gasket and/or can end on a second axial surface facing towards the gasket.

The locations where the through holes begin and end on a surface can be understood as the locations where the through holes penetrate a surface of the body which surrounds the through holes.

The through holes may be at an angle between 0° and 40°, preferably between 0° and 30° and particularly preferably between 0° and 20° relative to the longitudinal axis when viewed in a cross section through the respective through hole and the longitudinal axis.

The through holes can begin on a first axial surface of the flange facing away from the gasket and/or end on a second axial surface facing towards the gasket.

A ratio of the distance between the through holes and a characteristic size, in particular a diameter of the through holes, is less than three, preferably less than two, particularly preferably less than one. Formulated differently, it can be preferred that the through holes are arranged in a relatively dense manner.

There can preferably be provided more than three, or more than five, or more than 10, or more than 15 through holes.

The through holes can be manufactured as bores.

A cross-section of the through holes can preferably be of circular shape. Other shapes, such as elliptic, oval, kidney shaped, polygonal, in particular rectangular or triangular, are of course in principle possible.

The through holes can preferably be evenly spaced around the flange. Formulated differently, the through holes can be equidistant from each other.

A flange diameter of the flange can preferably be larger than a gasket diameter of the gasket.

As mentioned before, the coolant jacket can be disposed around the pre-chamber component, particularly preferably such that the coolant jacket completely encloses the pre-chamber component circumferentially.

A pump can be provided which is configured to pump the coolant through a cooling circuit, wherein the through holes are in fluid communication with the cooling circuit—in particular via the coolant jacket—such, that the coolant flows through the through holes in a direction towards the gasket, particularly preferably from a side of the flange facing away from the gasket (i.e., top-down cooling).

In a particularly preferable embodiment, a peripheral surface of the flange is circumferentially in contact with the cylinder head, preferably around the complete circumference of the flange. Formulated differently, the flange can contact the cylinder head on the outside, preferably on the whole peripheral surface. Then the flange completely closes off the coolant jacket such that the coolant can reach the gasket from the coolant jacket (or the other way round) preferably only through the through holes, which maximises the effect of the embodiment of invention of increasing the flow velocity of the coolant near the gasket for effective cooling.

The peripheral surface is preferably a cylindrical surface with the longitudinal axis of the pre-chamber component as axis.

BRIEF DESCRIPTION OF THE DRAWINGS

Further details and advantages are apparent form the figures and the accompanying description of the figures. The figures show:

FIG. 1b is a schematic depiction of cooling circuit in the embodiment of FIG. 1a, FIG. 2 is a further cross-section through the embodiment of FIG. 1a FIG. 3 is a perspective, partially cutaway depiction of the embodiment of FIG. 1a, and FIG. 4 is a perspective depiction of the pre-chamber component according to the embodiment of the invention of FIG. 1a.

DETAILED DESCRIPTION

Figure 1A:
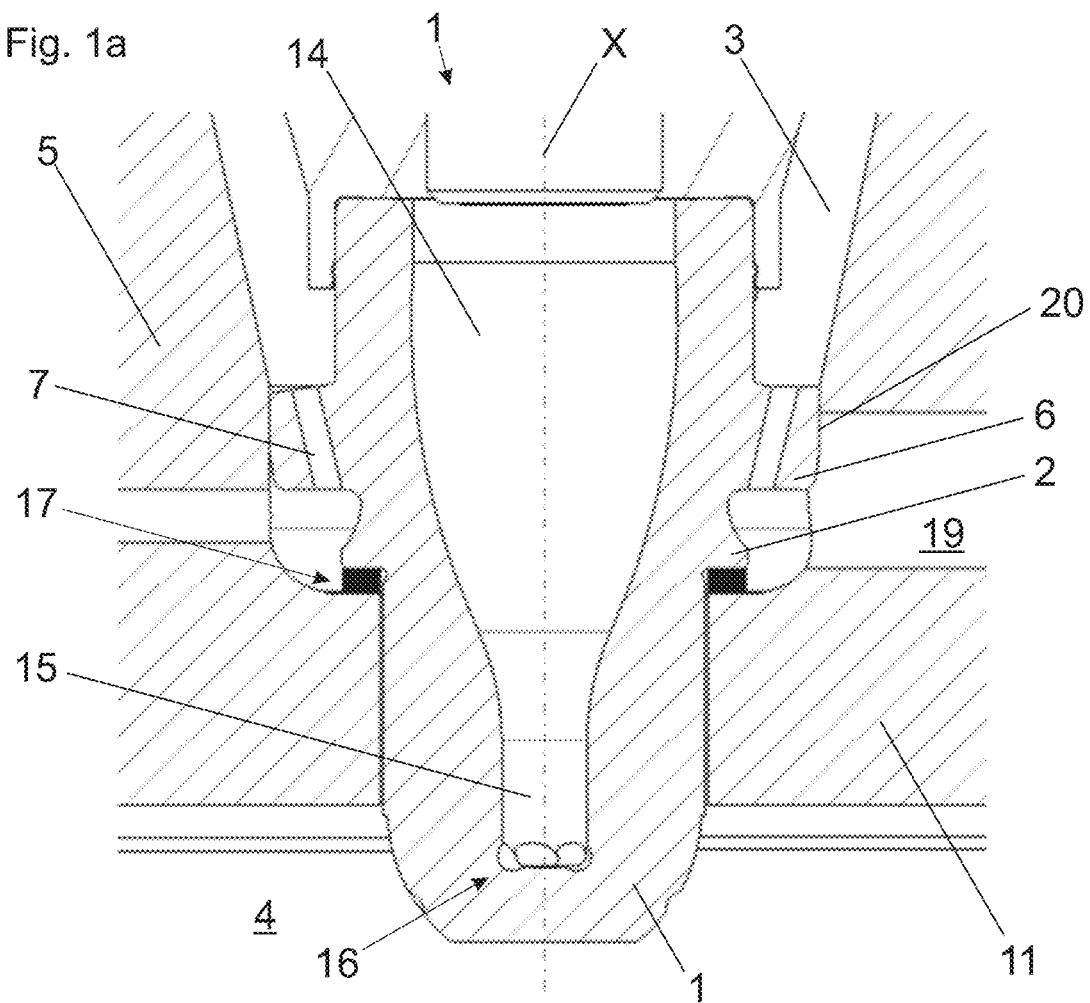
FIG. 1a is a cross-section through an internal combustion engine according to an embodiment of the invention.

FIG. 1a is a cross-section along the longitudinal axis X through an internal combustion engine 10 according to an embodiment of the invention.

The pre-chamber component 1 is disposed inside an opening (e.g., dedicated bore) of the cylinder head 5.

The pre-chamber component 1 comprises a pre-chamber 14, a riser passage 15, and spray passages 16, which are in fluid communication with each other. During operation, an air fuel mixture is ignited inside pre-chamber 14. The ignited air fuel mixture travels down the riser passage 15, further through the spray passages 16, and then enters the main combustion chamber 4 in the form of flame jets in order to ignite the air fuel mixture in the main combustion chamber 4 as swiftly and thoroughly as possible.

It should be noted that the spray passages 16 are in fluid communication with the main combustion chamber 4. In FIG. 1a, this is however not visible because of the particular cross-section which is depicted.

The portion of the pre-chamber component 1, which protrudes into the main combustion chamber 4 and which contains the spray passages 16 and potentially the lower part of the riser passage 15, may be called a tip portion or a nozzle portion.

The pre-chamber 1 is mounted in the cylinder head 5 by bracing the gasket 2 onto the cylinder head 5, in particular the fire plate 11 of the cylinder head 5, for example, by way of a bolted brace or a thread or the like which is not depicted.

For sealing purposes, a sealing ring 17 is disposed between the gasket 2 of the pre-chamber component 1 and the cylinder head 5.

A spark plug for igniting an air fuel mixture in the pre chamber 14 and a spark plug sleeve for mounting the spark plug on the pre-chamber component 1 are also present in this embodiment.

A coolant jacket 3 surrounds the upper part of the pre-chamber component 1 in the depiction of FIG. 1a. In this embodiment, water is used as coolant such that the coolant jacket 3 can be called a water jacket.

In this embodiment, a top-down cooling concept is employed so that the coolant is supplied to the coolant jacket 3. From there, the coolant travels through the through holes 7 which are disposed in the flange 6 of the pre-chamber component, and because of the orientation of the through holes 7, the coolant is directed to impinge directly onto the gasket 2. This results in an effective and specific cooling effect on the gasket 2 without cooling the main body of the pre-chamber component 1 too much.

The flange 6 in this embodiment has dimensions so that its peripheral surface 20 contacts the cylinder head 5. Coolant from the coolant jacket 3 is therefore forced through the through holes 7 in the flange 6 and is therefore completely directed at the gasket 2 as described before, optimising the positive effect of the embodiment of the invention.

After having impinged on the gasket 2, the coolant further travels through coolant channels 19 in the fire plate 11 and preferably recirculates in the cooling circuit 13.

It should be mentioned that the embodiment shown in FIG. 1a could also be used with a bottom-up cooling concept, such that the coolant is coming from the coolant channels 19. Also, in this case, the embodiment of the invention results in improved cooling of the gasket 2 because the flow velocity of the coolant is increased near the gasket 2. However, embodiments with top-down cooling are preferred.

Figure 1B:
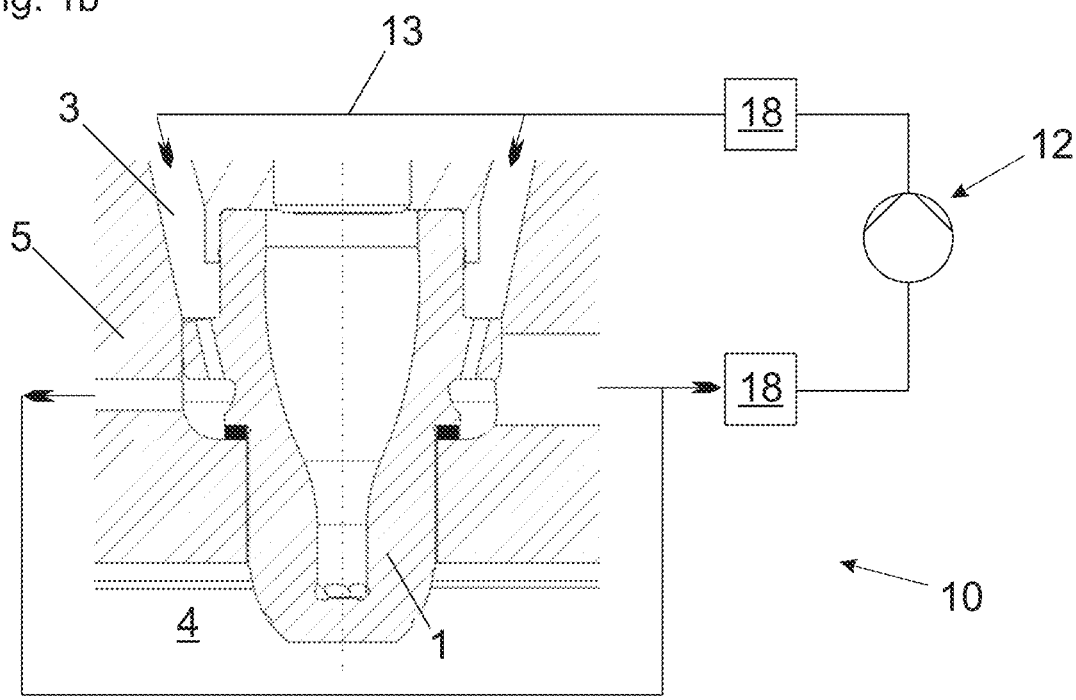

FIG. 1b depicts schematically how the embodiment of FIG. 1a is integrated in the cooling circuit 13 of the internal combustion engine 10.

A pump 12 is disposed so as to convey coolant into the coolant jacket 3. As described before, the coolant is conveyed through the through holes 7, impinges onto the gasket 2, and is further conveyed away via the coolant channels 19.

It should be noted that the cooling circuit 13 can comprise other components, such as other cooling cavities, filters, or the like, which is generally indicated at optional reference numerals 18.

Figure 2:
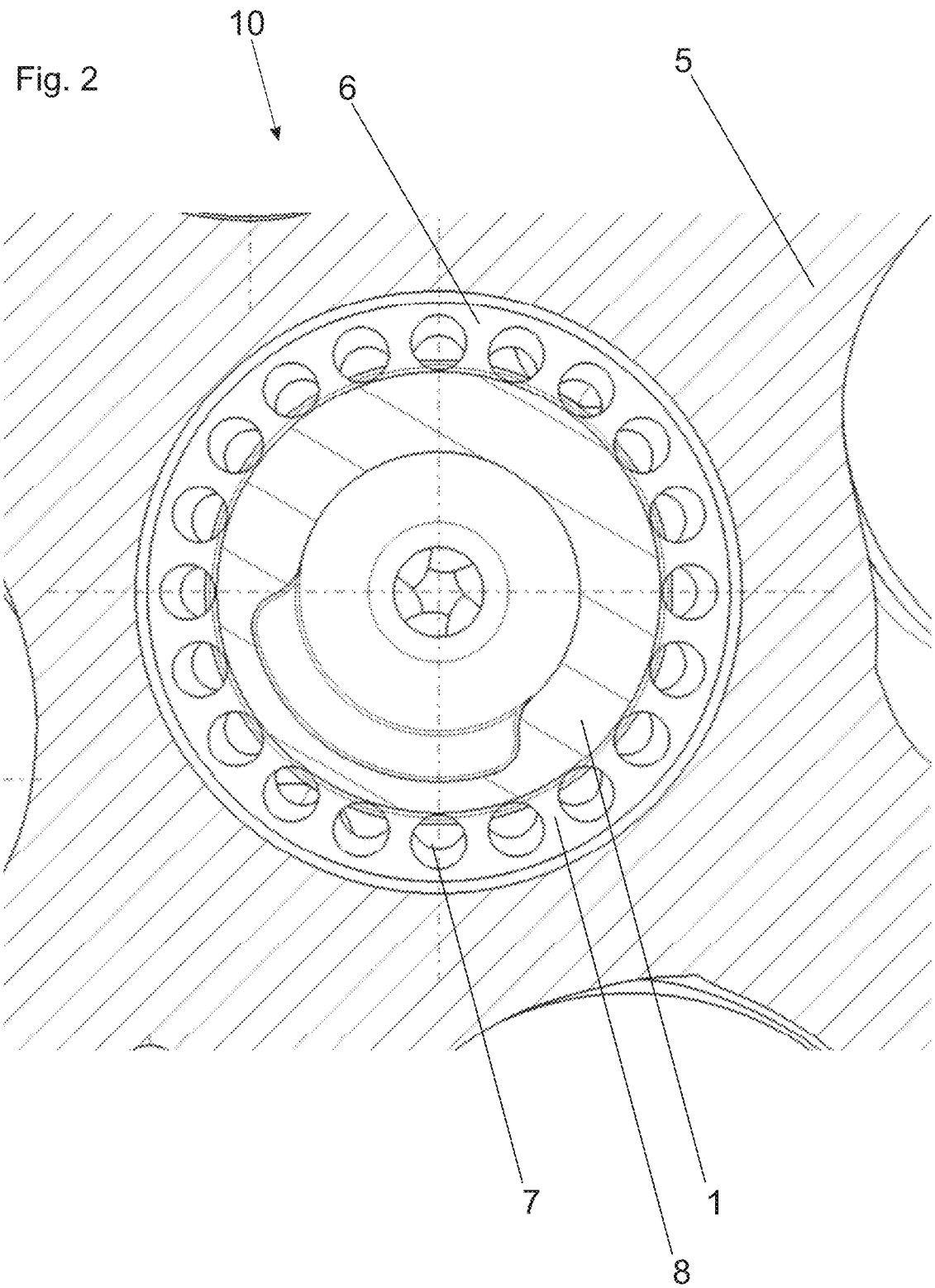

FIG. 2 shows a section of the embodiment of FIG. 1a. The depicted cross-section would be horizontal through the flange 6 in FIG. 1a.

It can be seen that, in this embodiment, there are 20 through holes 7, which are arranged relatively densely and evenly spaced around the flange 6.

FIG. 2 shows a view from the side of the flange 6 which faces away from the gasket 2 such that the first axial surface 8 is visible.

Figure 3:
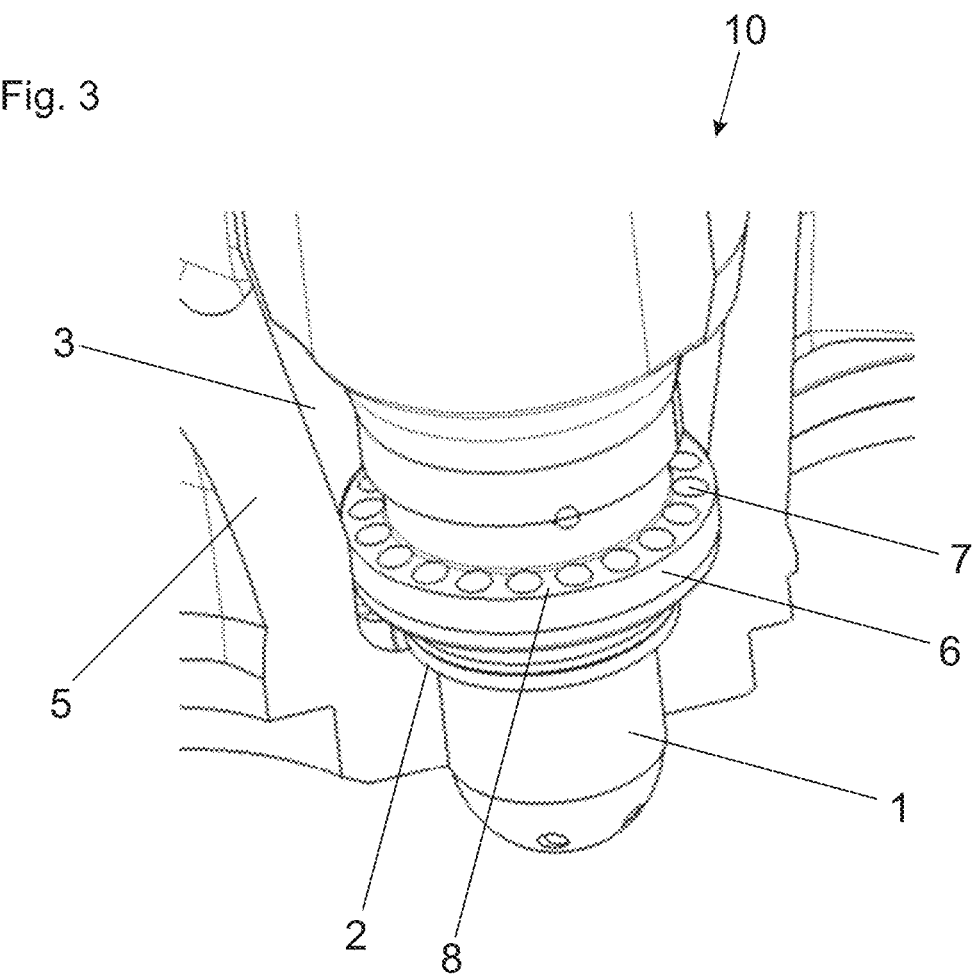

FIG. 3 shows the perspective, partially cutaway depiction of the embodiment of FIG. 1a, which visualizes the geometric arrangement of the pre-chamber component 1 inside the cylinder head 5.

Figure 4:
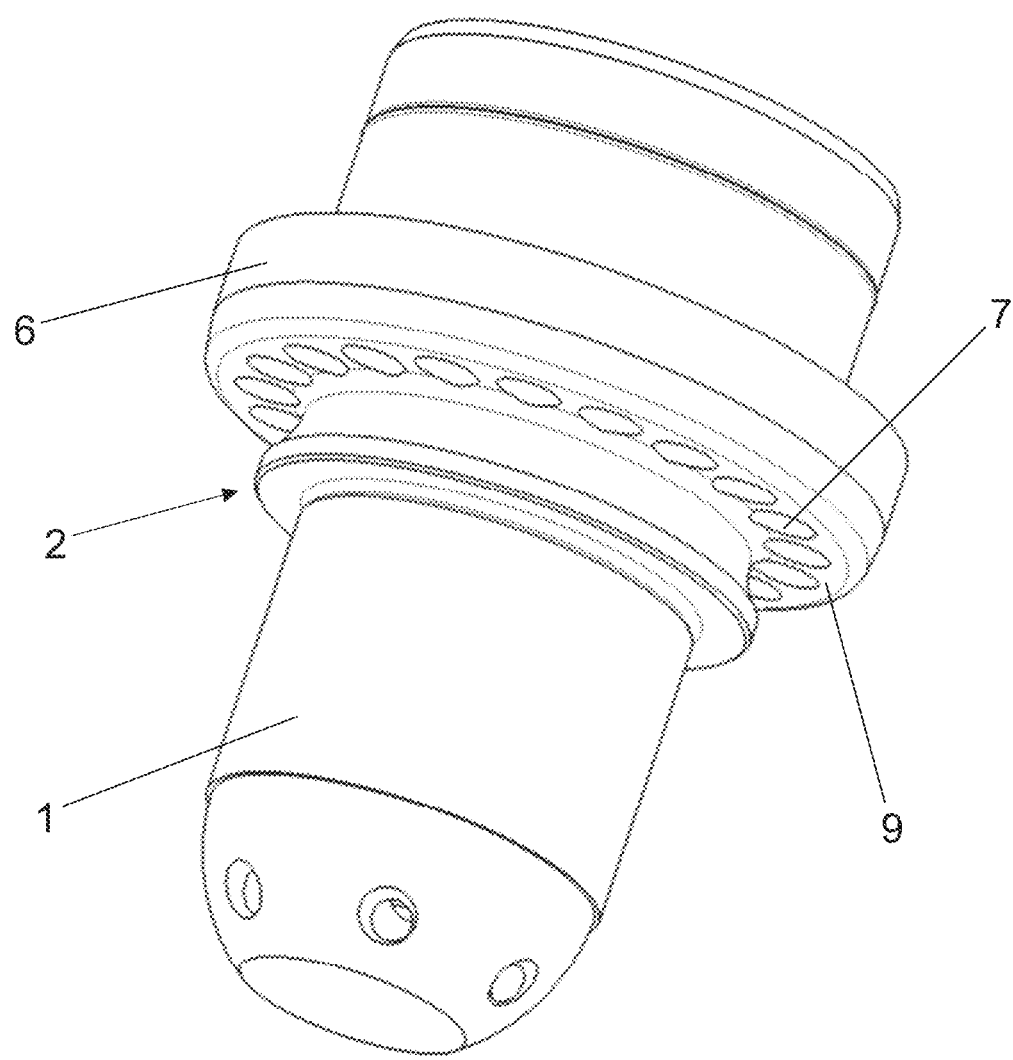

FIG. 4 depicts the pre-chamber component 1 according to the embodiment of FIG. 1 on its own in a perspective view. Here, also the second axial surface 9 is visible.

Viewing the figures together illustrates how the through holes 7 lead through the flange 6 from the first axial surface 8 to the second axial surface 9, such that the through holes are oriented towards the gasket 2.

The invention claimed is:

1. A system, comprising:
a pre-chamber component for an internal combustion engine comprising a longitudinal axis and a gasket for sealing a coolant jacket disposed around the pre-chamber component against a main combustion chamber of the internal combustion engine, wherein the gasket is configured to be braced against a cylinder head of the internal combustion engine, wherein the pre-chamber component comprises a flange that is axially distanced from the gasket along the longitudinal axis in a direction away from the main combustion chamber when the pre-chamber component is mounted in the cylinder head, wherein the flange comprises a plurality of through holes ending in a space between the gasket and the flange.

2. The system according to claim 1, wherein the plurality of through holes are oriented towards the gasket.

3. The system according to claim 1, wherein the plurality of through holes are configured to direct at least a portion of a coolant onto the gasket when the coolant flows through the plurality of through holes from a side of the flange facing away from the gasket.

4. The system according to claim 1, wherein the plurality of through holes are at an angle between 0° and 40° relative to the longitudinal axis when viewed in a cross section through the respective through hole and the longitudinal axis.

5. The system according to claim 1, wherein the plurality of through holes begin on a first axial surface of the flange facing away from the gasket and/or end on a second axial surface facing towards the gasket.

6. The system according to claim 1, wherein a ratio of the distance between the plurality of through holes and a diameter of the plurality of through holes is less than three.

7. The system according to claim 1, wherein the plurality of through holes are evenly spaced around the flange.

8. The system according to claim 1, wherein a flange diameter of the flange is larger than a gasket diameter of the gasket.

9. The system according to claim 1, comprising a cylinder head having the pre-chamber component, wherein the gasket is braced against a fire plate of the cylinder head.

10. The system according to claim 8, wherein a coolant jacket is disposed around the pre-chamber component.

11. The system according to claim 10, further comprising a pump configured to pump a coolant through a cooling circuit, wherein the plurality of through holes are in fluid communication with the cooling circuit via the coolant jacket, such that the coolant flows through the plurality of through holes in a direction towards the gasket.

12. The system according to claim 8, wherein a peripheral surface of the flange is circumferentially in contact with the cylinder head around the complete circumference of the flange.

13. The system according to claim 1, comprising the internal combustion engine having the pre-chamber component.

14. The system according to claim 13, comprising a generator driven by the internal combustion engine.

15. The system according to claim 1, wherein the plurality of through holes comprises at least ten through holes configured to impinge a coolant on the gasket.

16. A system, comprising:
a pre-chamber component of an internal combustion engine, wherein the pre-chamber component comprises:
a body having a pre-chamber volume; and
a flange extending circumferentially about the body, wherein the flange comprises a plurality of through holes, and the plurality of through holes are configured to route a coolant to a gasket between the body and a cylinder head of the internal combustion engine.

17. The system according to claim 16, comprising the gasket disposed about the body and spaced apart from the plurality of through holes.

18. The system according to claim 17, comprising the internal combustion engine having the pre-chamber component coupled to the cylinder head, wherein the gasket is configured to seat against a corresponding portion of the cylinder head.

19. A method, comprising:
routing a coolant flow through a plurality of through holes in a flange of a body of a pre-chamber component of an internal combustion engine, wherein the body comprises a pre-chamber volume, and the flange extends circumferentially about the body; and
cooling a gasket disposed about the body between the pre-chamber and a cylinder head of the internal combustion engine via the coolant flow.

20. The method according to claim 19, wherein cooling the gasket comprises impinging the coolant flow on the gasket.

* * * * *